(12) United States Patent
Kostelnik et al.

(10) Patent No.: US 6,620,234 B1
(45) Date of Patent: Sep. 16, 2003

(54) PROCESSES FOR PREPARING HYDROPHOBIC INORGANIC OXIDE PIGMENTS

(75) Inventors: Robert J. Kostelnik, Ellicot City, MD (US); Leon Weber, York, PA (US); Modasser El-Shoulbary, Crofton, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 75 days.

(21) Appl. No.: 09/709,159

(22) Filed: Nov. 10, 2000

Related U.S. Application Data

(60) Provisional application No. 60/165,362, filed on Nov. 12, 1999.

(51) Int. Cl.[7] .................................................. C09C 1/36
(52) U.S. Cl. ...................................... 106/445; 106/446
(58) Field of Search ................................ 106/426, 438, 106/443, 445, 450, 446, 452, 454, 457, 466, 468, 489, 499

(56) References Cited

U.S. PATENT DOCUMENTS

| | | |
|---|---|---|
| 2,488,440 A | 11/1949 | Heinrich |
| 2,559,638 A | 7/1951 | Krchma et al. |
| 2,717,246 A | 9/1955 | Kienle et al. |
| 4,061,503 A | 12/1977 | Berger et al. |
| 4,072,796 A | 2/1978 | Reinhardt et al. |
| 4,151,154 A | 4/1979 | Berger |
| 5,607,994 A | 3/1997 | Tooley et al. |
| 5,631,310 A | 5/1997 | Tooley et al. |
| 5,653,794 A | 8/1997 | Weber et al. |
| 5,889,090 A | 3/1999 | Tooley et al. |
| 5,959,004 A | 9/1999 | Tooley et al. |

OTHER PUBLICATIONS

Kopylov, V.M. et al., Hydrolytic Polycondensation of Organochlorosilanes, YDC 541.64:547.245:542.954, (1995). (Russian text and English translation) no month provided.

*Primary Examiner*—David Brunsman
(74) *Attorney, Agent, or Firm*—Kalow & Springut LLP

(57) ABSTRACT

The present invention provides a treatment method for rendering inorganic oxide particles, such as $TiO_2$ pigment, hydrophobic by predispersing a suitably reactive organohalosilane into an aqueous media, using intensive mixing means (such as a rotor stator emulsifier or inline static mixer) to form a reactive dispersion. When this dispersion is combined with inorganic oxide particles, such as $TiO_2$ pigment, under sufficient agitation, a hydrophobic inorganic oxide can be formed. The oxides formed by the present invention have good mechanical properties, such as dispersibility in nonpolar substances (i.e., plastics), and they do not degrade physical properties of the pigmented nonpolar substance, such as lacing resistance of thermoplastics.

15 Claims, No Drawings

PROCESSES FOR PREPARING HYDROPHOBIC INORGANIC OXIDE PIGMENTS

This application claims the benefit of the filing date of U.S. Provisional Application No. 60/165,362 filed Nov. 12, 1999 and entitled "Process for Preparing Hydrophobic Inorganic Oxide Pigments", the entire disclosure of which is hereby incorporated by reference into the present disclosure.

FIELD OF THE INVENTION

The invention relates generally to the preparation of hydrophobic inorganic oxide-based pigments, and more specifically to methods for treating inorganic oxide pigments in aqueous media with organosilicon compounds in order to introduce hydrophobic characteristics to the pigment.

BACKGROUND OF THE INVENTION

Titanium dioxide ($TiO_2$) is the premier white pigment used for whitening, brightening and opacifying paper, paints and plastics. Like many other inorganic oxides, untreated $TiO_2$ pigment is hydrophilic in nature and, as such, is readily wetted by water but not wet by nonpolar substances, such as hydrocarbons, plastics, etc. Accordingly, in order to incorporate $TiO_2$ into plastics, oil-based paints and other nonpolar substances, the surface of the $TiO_2$ must often be made hydrophobic to improve the dispersibility of the pigment in the nonpolar substance and to improve other properties of the resulting pigmented substance.

Numerous agents have been developed for making $TiO_2$ hydrophobic, including phosphorylated fatty acid derivatives, dialkylsulfosuccinates and various silicone-based agents. Some examples of "silicone-based agent" include silanes, substituted silanes, hydrosylates and condensates of these silanes, siloxanes, polysiloxanes, and substituted siloxanes and polysiloxanes. The substituted groups are often organic and/or functional, i.e. chemically reactive, groups. For the purposes of this disclosure this class of substituted silanes, siloxanes and polysiloxanes agents will be referred to as "organosilicon" agents.

In one approach for preparing hydrophobic $TiO_2$ pigment, the $TiO_2$ particles are treated with chemically nonreactive organosilicon compounds, such as polydimethylsiloxanes or other such agents. Typically, such agents are applied to inorganic oxides, like pigments, by spraying the agents undiluted or in solution onto the particle surfaces. However, the resulting pigments typically exhibit poor physical properties for high temperature applications and the nonreactive agent can migrate from the surface of the pigment leading to potential problems with heat sealing, print clarity and other such related problems in the final pigmented product.

Another approach for preparing hydrophobic $TiO_2$ pigment involves treating the inorganic pigment with a reactive silane that will bond directly to the pigment surface. U. S. Pat. Nos. 5,607,994; 5,631,310; 5,889,090; and 5,959,004 (all assigned to E. I. du Pont de Nemours and Company; herein referred to collectively as the "DuPont Patents") teach the coating of $TiO_2$ pigment with octyltriethoxysilane where it is intended that the silane directly bonds to the pigment surface. Typically, the reactive silane, for example an octyltriethoxysilane in the DuPont Patents, is sprayed directly onto the pigment when the pigment is dry or incorporated in a filter cake. Some prior art methods use mechanical mixers to facilitate the dispersing of the silane onto the pigment.

The disadvantages of these prior art techniques include incomplete coating of the pigment particles by the reactive silane, even with mechanical mixing, and less than optimal binding of the reactive silane to the pigment particle surface. Additionally, such techniques also produced processing problems with respect to the manufacture of the pigment and often introduce environmental problems by generating volatile organic compounds, such as ethanol.

Other prior art methods include applying reactive silanes in an organic slurry in order to get more complete and uniform coating of the pigment particles. The disadvantages of these techniques is that usually the organic solvent must be removed before processing of the pigment can proceed; thus adding an additional and expensive processing step to the production of the pigment.

The inventors in their earlier patent, U.S. Pat. No. 5,653,794, the disclosure of which is hereby incorporated by reference, describe a technique which overcomes the disadvantages of using organic solvents and the prior art environmental problems with respect to the generation of volatile organic compounds. This patent describes a treatment method for $TiO_2$ pigment wherein a halosilane is added to an aqueous slurry of $TiO_2$ pigment and water. The use of a halosilane, such as octyltrichlorosilane, avoids generation of volatile organic compounds, such as ethanol. In this process, hydrochloric acid is generated in solution as the by-product of the hydrolysis reaction of the silanes. Since the hydrochloric acid is in solution, it can easily be neutralized and disposed of as a salt; thus avoiding environmental problems associated with the release of volatile organic compounds. Moreover, because the reaction takes place in an aqueous slurry of pigment and water this treatment procedure does not require the removal of organic solvents from the pigment in order to continue processing.

It has been found, however, that the addition of the halosilane to an aqueous solution of pigment and water results in a high viscosity mixture which is often difficult to process. The present invention overcomes this difficulty while retaining the advantages of U.S. Pat. No. 5,653,794.

SUMMARY OF THE INVENTION

The present invention provides a treatment method for rendering inorganic oxide particles, such as $TiO_2$ pigment, hydrophobic which avoids the disadvantages of the prior art. It has been found that by predispersing a suitably reactive organohalosilane into an aqueous media and using intensive mixing means (such as a rotor stator emulsifier or inline static mixer), a reactive dispersion can be prepared. When this dispersion is combined with inorganic oxide particles, such as $TiO_2$ pigment, under sufficient agitation, the problems discussed above of the prior art are eliminated. The present inventive method provides unexpected processing advantages in pigment preparation and yields a more economical pigment product. Pigment preparation time and the processing equipment energy requirements are reduced. Additionally, the hydrophobic pigments prepared by using the present invention have good performance properties, such as dispersibility in nonpolar substances (i.e., plastics), and they do not degrade physical properties of the pigmented nonpolar substance, such as lacing resistance of thermoplastics.

DETAILED DESCRIPTION OF THE INVENTION

The present section details the preferred embodiments of the invention. These embodiments are set forth to illustrate the invention and aid in its understanding. Since this disclosure is not a primer on inorganic oxides or $TiO_2$ pigment production or their treatment or the design, manufacture or operation of treatment vessels, basic concepts known or readily determinable by those skilled in the field of TiO$_2$ production have not been set forth in detail. Concepts such as choosing appropriate manufacturing materials or solvents, or appropriate additives for the treatment process, or suitable conditions for operating the treatment process are known or readily determinable by those skilled in the industry. Attention is directed to the appropriate texts and references known to those in the art field for details regarding these and other concepts that may be necessary in the practice of the invention.

Methods for treating TiO$_2$ pigment with organosilicon compounds are well known in the prior art and are discussed in numerous references, including U. S. Pat. Nos. 2,488,440; 2,559,638; 4,061,503; and 4,151,154, the DuPont Patents and U.S. Pat. No. 5,653,794 by the present inventors. The teachings of these patents are incorporated into the present disclosure by reference.

The subject invention provides a method for preparing a hydrophobic inorganic oxide by (i) mixing a reactive silane with an aqueous media under conditions so that the reactive silane substantially condenses and forms an aqueous reactive dispersion and (ii) mixing the resulting aqueous dispersion with a slurry of pigment and water under conditions so that the reactive dispersion chemically reacts with the inorganic oxide directly or upon subsequent heating or drying.

Suitable reactive silanes useful in the practice of the invention maybe represented by the formula:

$$R_nSiX_{4-n}$$

where R represents a nonhydrolyzable aliphatic, cycloaliphatic or aromatic group (including a saturated or unsaturated branched or unbranched alkyl, aryl cycloalkyl or alkylaryl group) having 1 to 20 carbon atoms, X represents a halogen and n=1 or 2. Preferably, the reactive silane is an organochlorosilane, such as butyltrichlorosilane, isobutyltrichlorosilane, hexyltrichlorosilane, octyltrichlorosilane, octylmethyldichlorosilane, decyltrichlorosilane, dodecyltrichlorosilane, didecyldichlorosilane, dihexyldichlorosilane, dioctyldichlorosilane, octadecyltrichlorosilane or mixtures thereof.

More preferably, the reactive silane is an organochlorosilane having an R group with 4–10 carbons and, in particular, 6–8 carbons. The most preferred organohalosilane is hexyltrichlorosilane.

Inorganic oxides appropriate for use in the present invention include those which have surface hydroxyls capable of condensing with reactive silanes or their hydrolyates or condensates. Such inorganic oxides are represented by the rutile and anatase forms of titanium dioxide, kaolin and other clays, alumina, silica, aluminum trihydrate, zirconium oxide, zinc oxide, iron oxide, cadmium pigments, chromate pigments, chromium oxide pigments, glass fibers, glass flake, wollastonite and the like. Preferred are standard pigment-grade titanium dioxides, regardless of whether they have been obtained from titanium tetrachloride or from titanium sulfate.

The inorganic oxide can be an untreated inorganic oxide or an inorganic oxide whose surface has been treated by deposition thereon of phosphate, alumina, silica, zirconia and the like, using procedures known to practitioners in the field of inorganic oxide surface treatment. Preferably, the inorganic oxide is titania or TiO$_2$ pigment, whose surface is untreated or treated by deposition thereon of a hydrous phosphate, alumina, silica, zirconia or like-material.

A preferred mode for practicing the claimed invention typically proceeds as follows. A reactive organohalosilane, such as hexyltrichlorosilane (HTCS), is mixed with an aqueous media using a commercial type static mixer or emulsifier to form a dispersion that contains substantially the condensates of the silane. It is preferable to mix the silane with the aqueous media using a high speed emulsifier or agitator, such as an in-line rotor-stator mixer, in order to keep the resulting condensate well dispersed and to minimize any unreacted silane. Although agitation is not critical, the agitation should be sufficient to avoid gelling of the silane, its condensates or the dispersion. The residence time of the dispersion in the mixer typcally is very short, 0.5 to 1 second, although longer times may be used. The dispersion is aged (usually in the mixer or in a process line or batch mixer downstream) for about 1 second to about 120 seconds, preferably for around 20 seconds. Longer aging times can be used if sufficient agitation is present.

It is also preferred to maintain a pH value above or equal to about nine to aid in driving the conversion of the silane toward condensates of the silane. Although a high pH value of around 9 is preferred, it is contemplated that the invention may be practiced at lower pH values also, even pH values of 1–2. At lower pH values, there may be less conversion of the silane to its condensates but a reactive dispersion would still be formed. It is also contemplated that the invention will be practiced at the pH value that results from mixing the silane with the aqueous media; that is, no adjustment of the pH is made. It is also contemplated that the dispersion that results from mixing the silane with the aqueous media may be heated to aid in conversion of the silane to its condensates. The temperature to which the dispersion may be heated will be determined, for the most part, by the type of equipment that is available. Typically the dispersion may be heated to 70–90° C.

The resulting aqueous dispersion is added over a period of time to a reactor containing a slurry of TiO$_2$ pigment and water. The pigment slurry should be sufficiently agitated such: that the reactive dispersion is rapidly mixed into the bulk of the pigment slurry. The amount of aqueous dispersion added to the reactor is such so as to result in a concentration of organosilicon coating on the final pigment in the range of about 0.1 to about 5.0 weight percent based on the weight of the pigment.

After the dispersion is mixed with the pigment slurry, the entire mass is allowed to come to an equilibrium pH and consequently a uniform viscosity. The pH is then raised to flocculate the organically treated pigment and to facilitate filtration and washing of the pigment. Typically, additions of an alkali source, such as sodium hydroxide, are used to raise the pH up to a value of about 7–10 pH (although lower pH values may be used, including values as low as about 4). The slurry is aged for about 30 to 60 minutes to assure a uniform mixture. Additional adjustments may be made to the pH during or after aging. The pigment is then separated, washed until the oxide has a electrical resistivity of at least 3000 ohms, dewatered, sufficiently dried, collected and micronized.

Following micronizing, the treated pigment can be used for dispersion into a plastic material, such as a polyolefin material, typically polyethylene. The pigments of the present invention have shown excellent dispersion properties in plastics and do not degrade the lacing resistance properties of the resulting pigmented plastic films.

The hydrophobic pigment products of this invention offer processability in polymer composites as least as good as pigments prepared according to prior art procedures; that is, the dispersibility of the products of the present invention in polymers is at least as good as prior art pigments and the lacing resistance of the resulting polymer composites containing the products of the present invention is as good as prior art polymer composites.

Representative polymers in which the products of the present invention may be used include, but are not limited to, polymers of ethylenically unsubstituted monomers, including polyethylene, polypropylene, polybutylene and copolymers of ethylene with alpha-olefins containing 4 to 12 carbon atoms or vinyl acetate; vinyl homopolymers, acrylic homopolymers and copolymers, polyamides, polycarbonates, polystyrenes, acrylonitrile-butadiene-styrenes, polyethers and the like.

The following examples set forth preferred embodiments of the invention. These embodiments are merely illustrative and are not intended to, and should not be construed to, limit the claimed invention in any way.

EXAMPLES

Comparative Example 1

A slurry of $TiO_2$ and water was prepared in the following manner. Sufficient standard $TiO_2$ was added to a 150 gallon tank and diluted with water to obtain a $TiO_2$ slurry containing 192 pounds of $TiO_2$ at a concentration of 350 grams/liter. The tank was equipped with two orthogonal 9" bow tie mixers. The slurry was heated to, and maintained at, about 70° C. by directly injecting steam. The initial pH of the slurry was about 2.5. Next, about 837.7 grams of hexyl trichlorosilane (HTCS) were pumped into the tank over 45 minutes. The HTCS was directed onto the slurry surface about midway between the tank center and the outer wall. The pH of the slurry dropped to about 1.5 after addition of the HTCS. The HTCS treated slurry was very fluid and apparently well mixed.

The pH of the slurry was adjusted to 7.9 with about 1080 ml of a 50% sodium hydroxide solution. Significantly, the slurry viscosity increased noticeably as the pH rose above about 4.5. At a pH of about 7.9, the slurry was mixed well in the center of the tank, but there was virtually no motion in the slurry near the walls of the tank. A Brookfield viscosity of a sample of the slurry was about 1200 cps.

The slurry was aged at 70° C. and a pH of about 7.9 with mixing for about 45 minutes. After about 35 minutes of aging at these conditions the viscosity decreased to 400 cps. At the end of the aging period the pH had equilibrated to about 7.4. The pH was readjusted to about 8.5 and the slurry further aged for 20 minutes with stirring, still at 70° C. The Brookfield viscosity measurement at the end of the second aging period was 320 cps.

The HTCS treated $TiO_2$ slurry was filtered and washed using a rotary vacuum filter. The collected filter cake was oven dried at 110° C. for about 12 hours. Portions of the dried filter cake were forced through an 8 mesh sieve and steam micronized at 500° F. Lacing evaluations were conducted by measuring the relative size and number of holes generated in a film sample laid out on a dark surface, and the pigment gave excellent lacing resistance with a rating of 1.1.

Example 1

Example 1 was prepared in a manner similar to Comparative Example 1 except that a dispersion of about 2.3% HTCS in aqueous media was first prepared and reacted for approximately 2.4 minutes (see below) before introducing the resulting dispersion into the $TiO_2$ slurry.

As in the comparative example, a suitable $TiO_2$ slurry was added to a 150 gallon tank (32 inch diameter) and diluted to obtain a $TiO_2$ slurry containing 190 pounds of $TiO_2$ at a concentration of 350 grams/liter. The tank was equipped with two orthogonal 9" bow tie mixers, and the slurry was heated to and maintained at 70° C. by direct injection of steam. The initial pH of the slurry was about 2.5.

HCTS was reacted with water in a continuous flow arrangement to form the dispersion. A 2000 ml beaker was equipped with an UltraTurrax® Model T-45 high speed disperser operated at its highest speed. The HTCS flow rate was 19.2 grams/minute, and the water flow rate was 825.4 grams/minutes. This provided a residence time of 2.4 minutes. The aqueous dispersion formed from the HTCS and water was allowed to overflow into the tank containing the $TiO_2$ slurry in this manner over 43 minutes. The pH of the slurry was about 1.6 after addition of the dispersion, and the organically treated slurry was fluid and mixed well.

The pH of the slurry was adjusted to 8.2 with 1450 ml of 50% sodium hydroxide solution. In contrast to example 1, the viscosity did not increase noticeably as the pH was raised above about 4.5 as evidenced by the motion of the slurry in the tank. At a pH of 8.2, the Brookfield viscosity of a sample of the slurry removed from the tank was measured to be about 470 cps. The slurry was aged at 70° C. with mixing for 60 minutes. At the end of the aging period the pH had decreased to about 7.8 and the viscosity was measured to be about 500 cps.

The organically treated $TiO_2$ slurry was filtered and washed using a rotary vacuum filter. The filter cake was oven dried at 110° C. for about 12 hours. Portions of the dried filter cake were forced through an 8 mesh sieve and steam micronized at 500° F. Lacing evaluations were conducted, by measuring the relative size and number of holes generated in a film sample laid out on a dark surface and the product displayed excellent lacing resistance with ratings of 1.2 and 1.5 determined on two portions of the product. Thus, compared to the direct addition of HTCS to the $TiO_2$ slurry, addition of the dispersion of HTCS and water to the $TiO_2$ slurry yielded a mixture with significantly lower Brookfield viscosity, hence, easier processibility.

Example 2

The product was prepared according to the method of Example 1 with the exception that 630.3 grams of HTCS was reacted with water in the continuous flow emulsifier unit such that a 1.5% dispersion was formed, with a 2.0 minute residence time, before overflowing into 180 pounds of $TiO_2$ in a 350 grams/liter slurry. Brookfield viscosities before and after aging the organically treated slurry were 410 and 500 cps, respectively. The finished product yielded a lacing resistance value of 1.1.

Example 3

The product was prepared according to the method of Example 2 except that 125.5 grams of 85% phosphoric acid were added to 203 pounds of $TiO_2$ prior to addition of the dispersion. 552.7 grams of HTCS were reacted with water in the continuous flow unit to form a 2.0% dispersion, with a 4.1 minute residence time, before overflowing into the $TiO_2$ slurry. The pH at the end of the addition period of the HTCS/water reaction products was 1.6, and the Brookfield viscosity was measured as 470 cps. The pH of the mixture was adjusted to 7.8 using 50% sodium hydroxide and the mixture aged for 60 minutes at 70° C.

Following the 60 minute age, the pH was 7.7 and the Brookfield viscosity was measured as 490 cps. The pH was adjusted to 8.7 using 50% sodium hydroxide solution, and the product was finished according to example 2. The finished product gave a lacing resistance value of 1.2.

PREPARATION OF SAMPLES FOR LACING TESTING

50% $TiO_2$: 50% polyethylene concentrates were prepared using a Haake Rheocord 9000 Computer Controlled Torque Rheometer. 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by mixing was used to drive the rate of incorporation of the $TiO_2$ into the LDPE until a steady state mixture was achieved. The hot concentrate was removed from the mixing chamber and then placed into a Cumberland Crusher to obtain finely granulated 50% concentrate samples.

Lacing Evaluations

High temperature stability, or lacing resistance, is an important property of inorganic oxides used in polyethylene film applications. Lacing is believed to be a measure of concentrate volatility at specific weight percent pigment loadings and processing temperatures. Lacing tests were conducted on 50% $TiO_2$ concentrate samples prepared according to the method described above. The concentrates were conditioned for 48 hours at 23° C. and 50% relative humidity. The concentrates were then let down into the LDPE 722 to achieve a 20% loading of $TiO_2$ in the final film. Lacing evaluations were run on a 1" extruder equipped with a slot die for fabricating cast films. A temperature profile of 625° F. die, 515 F clamp ring, 415° F. zone 3, 350° F. zone 2, 300° F. zone 1 was used. The screw speed was set at about 90 rpm.

A 25.4 cm. polished chrome chill roll was used to cool and transport the films and was set to maintain a 75 mm film thickness. The chill roll distance from the die lips was about 22 mm and the temperature was about 27° C.

After the $TiO_2$/LDPE mix was placed in the hopper, the material was allowed to run until the appearance of white in the clear film was first noted. To ensure the concentration of $TiO_2$ in the film had stabilized, a two minute time interval was allowed before observations were recorded and a film sample taken. The extruder was then purged with LDPE until the film returned to clear. Lacing performance was ranked by counting the relative size and number of holes generated in a film sample laid out on a dark surface. A 1.0–3.0 rating system was used. A rating of 1 was given to films with no lacing, 2 was given to films showing the onset of lacing and 3 was given to films with extreme lacing. Increments of 0.1 were used to give some indication of relative performance between the samples.

Upon reading the present disclosure, including the above examples, alternative constructions and embodiments will become obvious to those skilled in the art. These variations are considered to be fully within the scope and spirit of the invention. The subject invention is only limited by the claims which follow and their equivalents.

What is claimed is:

1. A process for preparing hydrophobic titanium dioxide comprising the steps of:
   (i) mixing a reactive silane having a formula $R_nSiX_{4-n}$ wherein R represents a saturated or unsaturated branched or unbranched alkyl, aryl, cycloalkyl or alkylaryl group having 1 to 20 carbon atoms, X represents a halogen and n=1 or 2,
   with an aqueous media so that the reactive silane substantially condenses and forms a reactive aqueous dispersion,
   (ii) mixing the resulting aqueous dispersion with a slurry of titanium dioxide in water to produce an admixture,
   (iii) forming a hydrophobic coating on the titanium dioxide through a chemical reaction between the titanium dioxide and the dispersion, and
   (iv) washing, drying and micronizing said titanium dioxide and said dispersion to form a hydrophobic titanium dioxide.

2. The process of claim 1 wherein the reactive silane is mixed with the aqueous media in step (i) using an in-line rotor-stator mixer or an emulsifier.

3. The process of claim 1 wherein the reactive silane is mixed with a the aqueous media at a pH of greater than 9.

4. The process according to claim 1 wherein X is a chloro group, n=1, and R is an alkyl group having 1 to 20 carbons.

5. A process according to claim 4 wherein after said washing said titanium dioxide has an electrical resistivity of at least 3000 ohms.

6. A process according to claim 4 wherein the micronizing is performed using a steam micronizer, an air micronizer or both.

7. The process according to claim 1 wherein the silane is selected from the group consisting of hexyltrichlorosilane, hexyldichlorosilane, octyltrichlorosilane, octyldichlorosilane and mixtures thereof.

8. A process according to claim 1 further comprising the following steps:
   agitating the admixture until a uniform viscosity is obtained;
   adjusting the pH of the admixture to a pH in the range of about 6.5 to about 10; and
   aging the admixture.

9. The process according to claim 8 wherein the admixture is agitated until a Brookfield viscosity in the range of about 400 to about 500 cps is reached.

10. A process according to claim 1 wherein the amount of reactive silane is sufficient to form a hydrophobic coating of about 0.1 to about 5 weight percent based on the weight of the hydrophobic inorganicoxide titanium dioxide.

11. A hydrophobic titanium dioxide formed by the process of claim 1.

12. A process for preparing a hydrophobic titanium dioxide comprising the steps of:
   (i) mixing a reactive silane having a formula $R_nSiCl_{4-n}$ wherein R represents a saturated or unsaturated branched or unbranched alkyl group having 4 to 10 carbon atoms, Cl represents a chloro group and n=1 or 2, with an aqueous media at a pH of about 9 or greater, so that the reactive silane substantially condenses and forms a reactive aqueous dispersion;
   (ii) mixing the resulting aqueous dispersion with a slurry of titanium dioxide and water to form an admixture in which the dispersion chemically reacts with the titanium dioxide directly or upon subsequent heating or drying to form a hydrophobic titanium dioxide;
   (iii) agitating the admixture until a uniform viscosity is obtained;

(iv) adjusting the pH of the admixture to a pH in the range of about 6.5 to about 10;

(v) aging the admixture;

(vi) separating the hydrophobic titanium dioxide formed from the admixture;

(vii) washing the separated hydrophobic titanium dioxide until the hydrophobic titanium dioxide has a an electrical resistivity of at least 3000 ohms;

(viii) drying the hydrophobic titanium dioxide; and (ix) micronizing the hydrophobic titanium dioxide using a steam micronizer, an air micronizer or both.

13. The process according to claim 12 wherein the amount of reactive silane is sufficient to form a hydrophobic coating of about 0.1 to about 5 weight percent based on the weight of the hydrophobic titanium dioxide.

14. The process according to claim 12 wherein the silane is selected from the group consisting of hexyltrichlorosilane, hexyldichlorosilane, octyltrichlorosilane, octyldichlorosilane, and mixtures thereof.

15. A hydrophobic titanium dioxide formed by the process of claim 12.

* * * * *

UNITED STATES PATENT AND TRADEMARK OFFICE
CERTIFICATE OF CORRECTION

PATENT NO.     : 6,620,234 B1
DATED          : September 16, 2003
INVENTOR(S)    : Robert J. Kostelnik, Leon Weber and Modasser El-Shoulbary It is certified that error appears in the above-identified patent and that said Letters Patent is hereby corrected as shown below:

<u>Title page,</u>
Item [75], Inventor, please insert the following correction of inventor's name:

-- Modasser El-Shoubary --

Signed and Sealed this

Twenty-third Day of December, 2003

JAMES E. ROGAN
*Director of the United States Patent and Trademark Office*